Patented May 6, 1941

2,240,965

UNITED STATES PATENT OFFICE 2,240,965

PROCESS FOR PRODUCTION OF NITROGEN-SUBSTITUTED AMINO METHYLENE KETONES

Johannes Andreas van Melsen, Amsterdam, Netherlands, assignor to Shell Development Company, San Francisco, Calif., a corporation of Delaware No Drawing. Application May 27, 1939, Serial No. 276,220. In the Netherlands May 31, 1938

11 Claims. (Cl. 260—584)

This invention relates to an improved process for the production of nitrogen-substituted amino methylene ketones.

It is an object of the present invention to provide an improved and simple process for preparing high yields of nitrogen-substituted amino methylene ketones from readily available and inexpensive reagents. A further object of the invention is to provide a process adaptable to commercial production of these valuable products. A still further object of the invention is to provide a process so simple that marked economies in time and materials may be effected in its operation as compared to processes known heretofore.

I have found that nitrogen-substituted amino methylene ketones may be prepared in high yield by converting a ketone into an alkali metal compound of a hydroxy methylene ketone with a formic acid ester and an alkali metal or an alkali metal alkoxide, and subsequently treating the reaction mixture per se with a salt of a primary or secondary amino compound. I have also found that the conversion of the alkali metal compound of the hydroxy methylene ketone into the desired product may be promoted by the presence of a dehydrating agent.

The discovery that a high yield of nitrogen-substituted amino methylene ketones can be prepared by treating the reaction mixture with the salt of an amino compound without the necessity of isolating the alkali metal compounds of the hydroxy methylene ketones either in a crude or purified state makes the process a particularly suitable one for production of the desired products. Unreacted alkali metal or alkali metal alkoxide remaining in the reaction mixture from the first reaction does not adversely affect the second reaction and liberate free amine which would be lost. Furthermore, the other condensation products which are incidental to the first reaction do not reduce the yield of the desired product to any great extent. The elimination of the necessity of isolating the alkali metal compounds of the hydroxy methylene ketones is of great importance for the practical application of my process to large scale commercial production, since all difficulties and equipment necessary for isolating these intermediate compounds which, especially the lower members, are unstable with respect to moisture and air, are unnecessary, and considerable savings in time and materials are realized over methods known heretofore.

The first reaction which is believed to occur in the process of my invention is that between the ketone, the formic acid ester and the alkali metal or alkali metal alkoxide to form an alkali metal compound of a hydroxy methylene ketone. When an alkali metal is used, this reaction may be indicated by the following general equation:

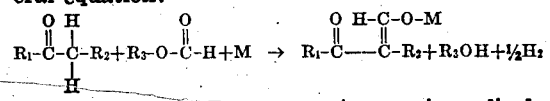

wherein $R_1$ and $R_3$ represent organic radicals, $R_2$ represents a hydrogen atom or an organic radical and M represents an alkali metal. When an alkali metal alkoxide is used, the same reaction product is produced, but since the alkali metal is already in an oxidized state, no hydrogen is liberated by the reaction. This reaction may be represented by the general equation:

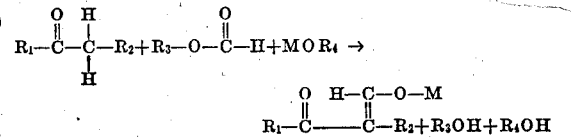

wherein $R_1$, $R_2$, $R_3$ and M designate the same radicals as above and $R_4$ represents an alkyl radical.

Treatment of the reaction mixture resulting from the first step of my process with an inorganic salt of a primary or secondary amino compound is believed to involve the reaction between the alkali metal compound of the hydroxy methylene ketone and the salt of the amino compound to produce the desired nitrogen-substituted amino methylene ketone. A mono-substituted product is obtained when a salt of a primary amino compound is used, and this reaction may be represented by the following general equation:

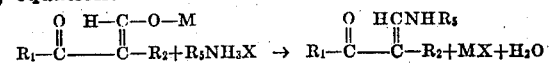

wherein $R_5$ represents an organic radical and X represents an inorganic salt radical. If a di-substituted product is desired, the reaction mixture may be treated with the salt of a secondary amino compound as indicated by the general equation:

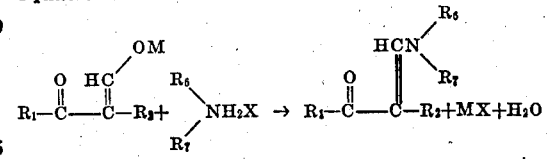

wherein $R_6$ and $R_7$ represent organic radicals.

Many ketones are suitable as starting materials for the process; it is only necessary that the ketone be one in which the carbon atom contiguous to the carbonyl group is linked directly to at least two hydrogen atoms. These ketones may be represented by the general formula:

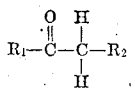

wherein $R_1$ and $R_2$ represent like or dissimilar radicals. $R_1$ may be an organic radical such as an aliphatic radical including methyl, ethyl, propyl, isopropyl, butyl, isobutyl, secondary butyl, tertiary butyl, butenyl, pentyl, pentenyl, cyclopentyl, cyclopentenyl, cyclohexyl, cyclohexadienyl, etc.; an aromatic radical including phenyl, tolyl, xylyl, benzyl, cinnamyl, phenyl ethyl, phenyl propyl, etc.; or a heterocyclic radical as furyl, pyrrolyl, thienyl, etc., as well as these radicals with one or more of their hydrogen atoms substituted by a halogen atom, a hydroxyl group, a carbinol group, an alkoxy group, an aroxy group, aralkoxy group, an amino group and the like. $R_2$ may be a hydrogen atom or an organic radical as was outlined above for $R_1$.

Any formic acid ester may be used in the process. For example, I may use methyl formate, ethyl formate, propyl formate, isopropyl formate, allyl formate, normal butyl formate, secondary butyl formate, crotyl formate, normal amyl formate, isoamyl formate, secondary amyl formate, benzyl formate, cinnamyl formate, furyl formate and the like.

The alkali metals which may be used in the process are lithium, sodium, potassium, rubidium and cesium. As explained above, these may be used per se or their compounds with alcohols may be used. The alkali metal alkoxides are alcoholates and result from the reaction of an alkali metal with an alcohol. Suitable alkali metal alkoxides include lithium methoxide, sodium ethoxide, potassium propoxide, rubidium isopropoxide, cesium butoxide, sodium secondary butoxide, potassium pentoxide, and the like.

Any inorganic salt resulting from the reaction of a primary or secondary amino compound with an inorganic acid may be employed to treat the reaction mixture and produce a high yield of the desired product. For instance, the inorganic salts obtained by reacting any inorganic acid such as hydrochloric, hydrobromic, hydroiodic, sulfuric, phosphoric, pyrophosphoric, phosphorous, hypophosphorous, chromic, chloric, perchloric, iodic, periodic, nitric, nitrous, boric, arsenic, hydrosulfuric, telluric, tellurous, carbonic, selenious acids and the like with any amino compound containing at least one replaceable amino-hydrogen atom such as primary or secondary alkyl amines, cycloparaffin amines, benzyl amine, aniline, piperidine, allyl amine, diallyl amine, crotyl amine, toluidine, alkyl diamines, phenylene diamines, aliphatic amino acids, as well as primary or secondary amino compounds with such groups as $-CH_2-CO-O-C_6H_5$,

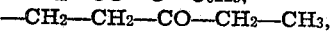

$-CH_2-O-CH(CH_3)_2$, and the like linked to the nitrogen atom may be utilized in the process.

Room temperature may be ordinarily employed in reacting the ketone and the formic acid ester with the alkali metal or alkali metal alkoxides. By reacting the materials at about room temperature, any expense necessary for heating the reaction mixture is eliminated. If desired, however, temperatures somewhat higher or lower than room temperature may be used, say between about 0° C. and 50° C. A reaction temperature of about room temperature is preferred, and since some heat is generated by the reaction, it may be desirable to utilize cooling means to maintain the temperature of the reaction mixture approximately constant. A coil in the reaction vessel through which is circulated a cold liquid, such as brine, is a suitable cooling means. The reaction involved in the second step of the process is also preferably conducted at about room temperature, but, if desired, temperatures in about the same range suitable in the first step may be used.

When an alkali metal is used in the first step of the process, it may be advantageous to have an inert atmosphere above the reaction mixture. Such a procedure eliminates any danger of fire caused by ignition of the hydrogen. The air in the reaction vessel may be swept out by flushing the vessel with an inert gas such as nitrogen, methane, ethane, ethylene, etc., before the reactants are brought together and the hydrogen is generated. It is preferred to sweep the vessel with hydrogen because then the hydrogen generated is not contaminated with any foreign gas and is in a very pure state suitable for use in many other processes.

The reactions may, in general, be made to proceed more smoothly by carrying out the reaction in the presence of an inert solvent such as a petroleum fraction, an aromatic hydrocarbon, an ether, an alcohol and the like. Inert solvents such as pentane, hexane, benzene, methyl alcohol, ethyl alcohol, isopropyl alcohol, diethyl ether, diisopropyl ether, etc., are especially suitable.

It is essential that the reaction in the first step be carried out in the substantial absence of water, since any water present will react with the alkali metal or alkali metal alkoxide and waste this reagent.

The reaction in the second step of the process is preferably conducted in the presence of a dehydrating agent. When a dehydrating agent is used the yield of the desired product is considerably higher than when one is not used. I have found the most satisfactory agent to use for this purpose to be anhydrous sodium sulfate. However, other dehydrating agents which may be used are anhydrous copper sulfate, calcium chloride, and the like.

In general, approximately stoichiometric amounts of reactants may be used in the process. It may, however, be desirable in some cases to use an excess of one reagent and this may be done, but a considerable excess of the alkali metal or alkali metal alkoxide is ordinarily to be avoided.

As a rule, the alkali metal salt formed by the second reaction, together with the salt used as a dehydrating agent, will be largely present as a precipitate in the reaction mixture. This material may be removed from the reaction mixture by filtering; any of the product remaining in the filtered precipitate may be recovered by washing the precipitate with a suitable solvent. The inert solvent used as diluent and any readily volatile incidental materials may be then evaporated from the reaction mixture. The final purification of the nitrogen-substituted amino methylene ketone is best done by distillation of the crude product in vacuo.

The nitrogen-substituted amino methylene ketones obtained by the process are valuable and useful materials. They may be used as intermediates in the production of numerous valuable chemicals including anti-knock compounds, pharmaceuticals, surface-active agents, etc.

The following example is given only for the purpose of further illustrating the process of my invention:

*Example*

About 345 gm. of metallic sodium and about 1000 cc. of pentane were introduced into a flask having a capacity of approximately 10 liters, whereupon a mixture consisting of about 870 gm. of acetone, 1915 gm. of secondary amyl formate and 3500 cc. of pentane was added dropwise with efficient stirring and cooling of the reaction mixture so that the temperature did not exceed about 20° C. After the addition of the second group of reagents, the mixture was stirred for another 2 hours at about 20° C., and then about 990 gm. of ethyl amine hydrochloride and about 1900 gm. of dry sodium sulfate were added to the reaction mixture. The mixture was stirred for 16 hours at about room temperature, after which the solid substance present therein was removed from the reaction mixture by filtration and washing. The solvent was next evaporated from the filtrate and the ethyl amino methylene acetone in the residue was purified by vacuum distillation. The yield of the product was about 72 per cent based on the acetone.

I claim as my invention:

1. In a process for the production of a N-substituted amino methylene acetone wherein said substituent is a hydrocarbon radical consisting of first reacting together in the presence of a light petroleum fraction at a temperature between about 0° C. and about 50° C. acetone, a formic acid ester, and metallic sodium, and subsequently reacting the resulting sodium salt of hydroxy methylene acetone with a hydrochloride salt of a primary amine, the step which comprises treating the reaction mixture from said first reaction, per se, without separation or removal of any constituents therein, with said salt of the amine in the presence of anhydrous sodium sulfate.

2. In a process for the production of a N-substituted amino methylene ketone wherein said substituent is a hydrocarbon radical consisting of first reacting together in the presence of a hydrocarbon at a temperature between about 0° C. and about 50° C. a ketone containing at least two hydrogen atoms linked directly to a carbon atom contiguous to the carbonyl group, a formic acid ester, and an alkali metal, and subsequently reacting the resulting alkali metal salt of the hydroxy methylene ketone with a hydrochloride salt of a primary amine, the step which comprises treating the reaction mixture from said first reaction, per se, without separation or removal of any constituents therein, with said salt of the amine in the presence of anhydrous sodium sulfate.

3. In a process for the production of a N-substituted amino methylene ketone wherein said substituent is a hydrocarbon radical consisting of first reacting together in the presence of a substantially inert organic solvent a ketone containing at least two hydrogen atoms linked directly to a carbon atom contiguous to the carbonyl group, a formic acid ester, and an alkali metal, and subsequently reacting the resulting alkali metal salt of the hydroxy methylene ketone with an inorganic salt of a primary amine, the step which comprises treating the reaction mixture from said first reaction, per se, without separation or removal of any constituents therein, with said salt of the amine in the presence of an inorganic salt which acts as a dehydrating agent.

4. In a process for the production of a N-substituted amino methylene ketone containing at least one hydrocarbon radical as the substituent linked directly to the nitrogen atom consisting of first reacting together in the presence of a hydrocarbon at about room temperature a ketone containing at least two hydrogen atoms linked directly to a carbon atom contiguous to the carbonyl group, a formic acid ester, and sodium ethoxide, and subsequently reacting the resulting sodium salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine in the presence of an inorganic salt which acts as a dehydrating agent.

5. In a process for the production of N-substituted amino methylene ketone containing at least one hydrocarbon radical as the substituent linked directly to the nitrogen atom consisting of first reacting together in the presence of a substantially inert organic solvent at a temperature between about 0° C. and about 50° C. a ketone containing at least two hydrogen atoms linked directly to a carbon atom contiguous to the carbonyl group, a formic acid ester, and an alkali metal alkoxide, and subsequently reacting the resulting alkali metal salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine in the presence of an anhydrous salt which acts as a dehydrating agent.

6. In a process for the production of N-substituted amino methylene ketone containing at least one hydrocarbon radical as the substituent linked directly to the nitrogen atom consisting of first reacting together in the presence of a substantially inert organic solvent a ketone containing at least two hydrogen atoms linked directly to a carbon atom contiguous to the carbonyl group, a formic acid ester, and an alkali metal alkoxide, and subsequently reacting the resulting alkali metal salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine in the presence of an anhydrous salt which acts as a dehydrating agent.

7. In a process for the production of N-substituted amino methylene ketone containing at least one hydrocarbon radical as the substituent linked directly to the nitrogen atom consisting of first reacting together in the presence of a substantially inert organic solvent at about room temperature a ketone containing at least two hydrogen atoms linked directly to a carbon atom contiguous to the carbonyl group, a formic acid ester, and a reagent selected from the group consisting of alkali metals and alkali metal alkoxides, and subsequently reacting the resulting alkali metal salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine in the presence of an anhydrous salt which acts as a dehydrating agent.

8. In a process for the production of N-substituted amino methylene ketone containing at least one hydrocarbon radical as the substituent linked directly to the nitrogen atom consisting of first reacting together in the presence of a substantially inert organic solvent a ketone containing at least two hydrogen atoms linked directly to a carbon atom contiguous to the carbonyl group, a formic acid ester, and a reagent selected from the group consisting of alkali metals and alkali metal alkoxides, and subsequently reacting the resulting alkali metal salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine in the presence of an anhydrous salt which acts as a dehydrating agent.

9. In a process for the production of N-substituted amino methylene ketone containing at least one hydrocarbon radical as the substituent linked directly to the nitrogen atom consisting of first reacting together in the presence of a substantially inert organic solvent a ketone containing at least two hydrogen atoms linked directly to a carbon atom contiguous to the carbonyl group, a formic acid ester, and a reagent selected from the group consisting of alkali metals and alkali metal alkoxides, and subsequently reacting the resulting alkali metal salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine in the presence of an anhydrous salt which acts as a dehydrating agent.

10. In a process for the production of N-substituted amino methylene ketone containing at least one hydrocarbon radical as the substituent linked directly to the nitrogen atom consisting of first reacting together a ketone containing at least two hydrogen atoms linked directly to a carbon atom contiguous to the carbonyl group, a formic acid ester, and a reagent selected from the group consisting of alkali metals and alkali metal alkoxides, and subsequently reacting the resulting alkali metal salt of the hydroxy methylene ketone with a compound selected from the class consisting of the inorganic salts of primary and secondary amines, the step which comprises treating the reaction mixture from said first reaction, per se, without separation or removal of any constituents therein, with said salt of the amine.

11. In a process for the production of N-substituted amino methylene ketone containing at least one hydrocarbon radical as the substituent linked directly to the nitrogen atom consisting of first reacting together a ketone containing at least two hydrogen atoms linked directly to a carbon atom contiguous to the carbonyl group, a formic acid ester, and a reagent selected from the group consisting of alkali metals and alkali metal alkoxides, and subsequently reacting the resulting alkali metal salt of the hydroxy methylene ketone with an inorganic salt of an amine containing at least one replaceable hydrogen atom linked to the nitrogen atom, the step which comprises treating the reaction mixture from said first reaction, per se, without separation or removal of any constituents therein, with said salt of the amine.

JOHANNES ANDREAS van MELSEN.